United States Patent [19]
Cohen

[11] 3,850,806
[45]* Nov. 26, 1974

[54] FILTER AND WATER RECIRCULATION SYSTEM

[76] Inventor: Harvey K. Cohen, 400 Cozine Ave., Brooklyn, N.Y. 11207

[ * ] Notice: The portion of the term of this patent subsequent to Mar. 13, 1990, has been disclaimed.

[22] Filed: Mar. 8, 1973

[21] Appl. No.: 339,141

Related U.S. Application Data

[63] Continuation-in-part of Ser. No. 127,292, March 23, 1971, Pat. No. 3,720,318.

[52] U.S. Cl. .............................................. 210/169
[51] Int. Cl. ............................................. E04h 3/20
[58] Field of Search ...................... 119/5; 210/169

[56] References Cited
UNITED STATES PATENTS

| | | | |
|---|---|---|---|
| 3,390,665 | 7/1968 | Wininger | 210/169 |
| 3,418,973 | 12/1968 | Saito | 210/169 |
| 3,472,381 | 10/1969 | Halpert | 210/169 |
| 3,477,580 | 11/1969 | Willinger | 210/169 |
| 3,516,544 | 6/1970 | Sesholtz | 210/169 |
| 3,720,318 | 3/1973 | Cohen | 210/169 |

OTHER PUBLICATIONS

Cox, "Filtration in the Marine Aquarium," The Aquarist, Jan. 1970, pp. 306–312.

*Primary Examiner*—Charles N. Hart
*Attorney, Agent, or Firm*—Peter L. Berger

[57] ABSTRACT

An aquarium filter water recirculation system comprises a water-carrying and an inner air-carrying member attached to a base member which is supported above the floor of an aquarium. Air is passed through the inner cylindrical tube, diffused, and mixed with the water in the water-carrying member. The base member is made of polyvinyl chloride and is provided with a corrugated regular contour above which rests the gravel bed of the aquarium.

8 Claims, 3 Drawing Figures

PATENTED NOV 26 1974

3,850,806

FILTER AND WATER RECIRCULATION SYSTEM

This is a Continuation-In-Part application of my prior application Ser. No. 127,292, filed Mar. 23, 1971 and now U.S. Pat. No. 3,720,318, issued Mar. 13, 1973.

BACKGROUND OF THE INVENTION

This invention relates to an aquarium filter system, and more particularly, to an under gravel filter.

In aquariums, an important element for the health and well-being of the fish is an efficient filter system, such as a biological filter, to remove impurities from the aquarium water. An integral element in such filters is a water circulation system which carries the water through the biological filter in which the impurities in the system are removed and in which other chemical processes necessary to the maintenance of life within the aquarium are accomplished.

Among the foremost of such water circulation systems is the undergravel filter system utilizing a plurality of tubes connected to a base member supporting the gravel bed of the aquarium. These tubes generally are separated by a slight distance with a channel connection therebetween. Air is pumped into one of the tubes and carried to the other which is a water-carrying tube. The air mixes with the water thus providing a combined weight that is less than the other water in the water-carrying tube. The buoyancy effect or "airlift" effect is such to cause the water in the water-carrying tube to be lifted.

When the water-carrying tube is submerged in water in a vertical position, the water levels inside the pipe and in the aquarium equilibrate. As the lighter air-water mixture moves to the top of the water-carrying tube, heavier water within the aquarium moves to replace the mixture. As long as air is injected, equilibrium never occurs and the air-water mixture is returned to the aquarium. By mixing the air and water, aeration is accomplished, which is important in the well-being of the aquarium system.

Such prior art water circulation systems suffer from several disadvantages. The flow rate efficiency obtained, in view of the motor used to supply the air, is generally low. The air injected into the water-carrying tube is not diffused thereby decreasing the efficiency of the aeration process. In addition, these prior art systems are often expensive, difficult to use and not readily adaptable to the salt water hobbyist because of the materials used.

In the prior art, there also exists undergravel filter and water recirculation systems advantageously employing a lift tube in which an air-carrying tube is inserted at an angle through the side of a water-carrying tubular member. As exemplary of such systems, reference may be had to U.S. Pat. No. 2,769,779 issued on Nov. 6, 1956 to Vansteenkiste et al. These type lift tube assemblies have similar disadvantages. For instance, when an air stone is used as a diffuser at the end of the air tube, the angular penetration of the air tube places a maximal frontal surface of the air stone directly in the path of the water flowing through the water-carrying tube such that the water recirculation flow rate may be adversely affected. Further, the prior art lift tube assemblies, such as that illustrated above, are cumbersome to handle and often require the hobbyist to place his hand within the aquarium to remove the assembly. Since the air in the air tube is directed at an angle with respect to the axis of the water-carrying member, a torque or cock like effect results which tends to move the assembly upwardly and at an angle with respect to the base of the aquarium.

SUMMARY OF THE INVENTION

An object of my invention is to provide an improved water recirculation and filtering system obviating the above disadvantages.

Another object of my invention is to provide an airlift apparatus for the water circulation system which remedies the above disadvantages.

Still another object of my invention is to provide a compact and efficient airlift system.

Other objects, advantages, and features of this invention will become more apparent from the following description.

In accordance with the principles of my invention, the above objects are accomplished by providing for an aquarium system, an undergravel aquarium filter which comprises a base member resting beneath the gravel and maintained above the bottom of the aquarium tank, a water-carrying tubular member which is connected to the base member, and an air-carrying tubular member which is located within the water-carrying member and terminates therein. As a feature of my invention, the surface of rotation of the inner air-carrying tube about the central axis of the water-carrying tube is always confined within the inner surface of the outer water-carrying tube. The inner tube is inserted through the top of the outer tube and substantially parallel and coaxial therewith. Air is carried through the air-carrying member to mix with the water thereby producing a combined weight which is less than the water in the water-carrying tube, and its buoyancy lifts it to the top thereof.

An air stone is provided with a recess into which the air-carrying member is fit, and the air stone acts as a diffuser thereby enhancing the aeration of the water circulated within the aquarium system. With the passing of time, swelling of the air stone causes the fit between the air-carrying tube and the air stone to be extremely firm preventing the air stone from being pushed off the end of the air-carrying tube. As a feature of this invention, the coaxial relationship of the two tubular members enables the air stone to provide a minimal frontal surface blocking the flow of water.

The water-carrying tube has a vertical portion and an elbow bend at the top terminating in a horizontal portion. An aperture is provided in the elbow bend segment thereof directly above the vertical portion through which the smaller cylindrical air-carrying tube is passed and is permanently fixed in position by sealing on the like. In this manner, the depth at which the diffused air enters the water-carrying tube is permanently set so that the flow rate within the recirculation system is known.

DETAILED DESCRIPTION

Figure 1:
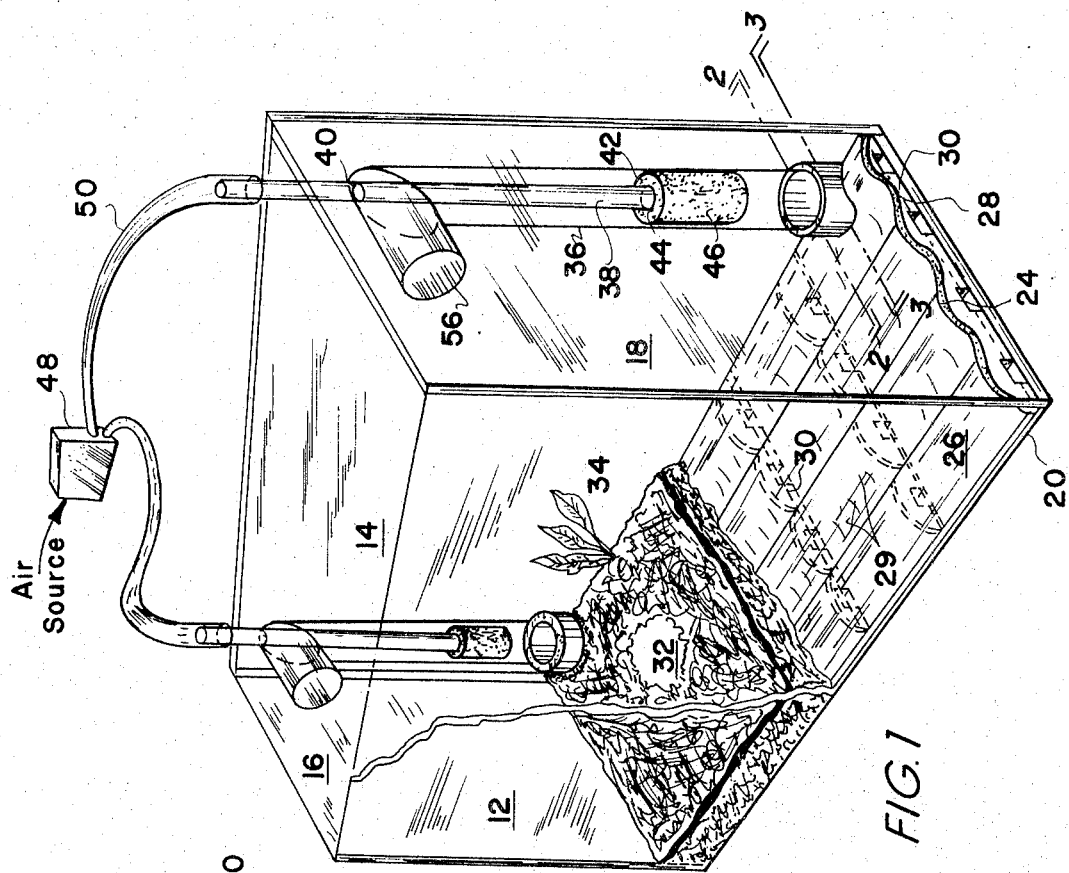
FIG. 1 is a perspective view of an aquarium with the water recirculation and filter system of this invention.

Referring to the FIGS., and particularly FIG. 1, there is shown an aquarium 10 having front and back sides 12 and 14, side walls 16 and 18, and a floor or bottom 20. The aquarium is constructed in the conventional manner and is adapted for use with a salt water or fresh water system.

An undergravel filter and water recirculation system is provided and comprises a base member 22 including a corrugated plate 24 having alternating crown and valley regions 26 and 28, respectively, and spaced-apart apertures 29 located in the valley regions 28. The corrugated plate has the form of a smooth waveshape such as a sinusoid and is formed of a non-porous material. In addition, a plurality of spaced-apart support members 30 integrally formed with the plate 24 depend therefrom and rest upon the floor or bottom 20 of the aquarium providing a space between the valley region 28 and the floor 20.

The base member 22 is adapted to support a gravel bed 32 which is conventionally found in most aquariums. The gravel bed acts as a filter in the biological filtration process occurring within the aquarium system. Suitable decorative animate or inanimate objects, such as a plant 34, are frequently placed within the gravel for aesthetic purposes.

In accordance with a feature of this invention, a lift tube assembly is provided which comprises an elbow shaped water-carrying member 36, preferably cylindrical, and an air-carrying member 38, also cylindrical in shape. The member 36 comprises a vertical portion 37 and a horizontal portion 39. An aperture 40 is provided in the horizontal portion 39 directly above the vertical portion 37 at the top of the water-carrying cylindrical tubular member 36 through which the air-carrying member 38 is inserted. By glue or heat sealing the air-carrying member is permanently fixed in place. The distal end 42 of the air-carrying member 38 is friction fit within a recess 44 of a diffuser means of air stone 46, preferably made of a porous wood. An air pump 48 is connected by means of a hose 50 to the top of the air-carrying member 38. As illustrated in FIG. 1, two such airlift mechanisms are provided at either end of the aquarium 10.

Figure 3:
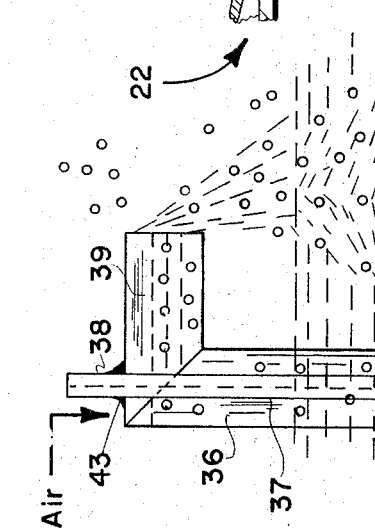
FIG. 3 is a sectional view taken along line 3—3 of FIG. 1 illustrating the connection between the water-carrying and base members of my invention.

Referring more particularly to FIG. 3, the base member 22 is provided with a connector means 52 into which is inserted the distal end 54 of water-carrying member 36 and is held therein by means of a friction fit.

Figure 2:
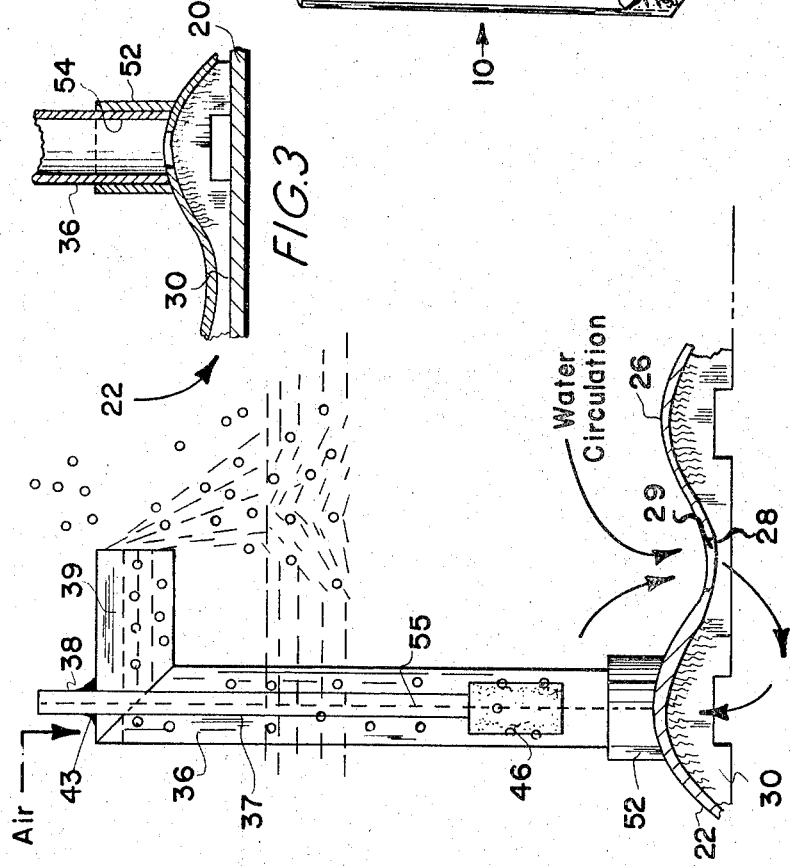
FIG. 2 is a sectional view taken along line 2—2 of FIG. 1 illustrating water-carrying and inner air-carrying members connected to a base member forming a part of the present invention.

With reference to FIGS. 1 and 2, the operation of this invention will be more fully described. When the water-carrying tube 36 is placed in the connector 52, the water level within the tube will be equal to that within the aquarium 10. Upon activation of the air pump 48, air is forced along conduit 50, through air-carrying tube 38 and through diffuser 46 to mix with the water in the water-carrying tube. The air-carrying tube 38 is substantially coaxial with the water-carrying tube 36. As a result thereof, the air stone presents a minimal frontal surface to the flow of water within the water-carrying tube 36, and further, the force of the air is substantially parallel to the water-carrying tube thus eliminating the undesirable torque or cocking like effect found in the oblique entry of the prior art tube. Further, the air-carrying tube 38 is straight without a bend therein which would hinder the flow of air therethrough.

The mixture of air and water is lighter than the remaining water within the tube, and the buoyance of the mixture forces the aerated mixture to the top of tube 36 and back into the aquarium through the elbow bend segment 56 of the water-carrying tube. In this manner, the continued supply of air from pump 48 will maintain a state of disequilibrium throughout the water recirculation system and causes water to flow through the aquarium 10, base member 22 and water-carrying tube 36. It has been found that the flow rate achievable with my invention is significantly greater than that obtainable with prior art devices.

As a result of the location of the horizontal portion above the level of water within the aquarium and the elbow bend construction thereof, the lift tube assembly may be conveniently handled without slippage or serious disturbance to the fish within the aquarium.

In accordance with yet another feature of this invention, the air and water-carrying members are made of a rigid plastic, such as cellulose-acetate-butyrate (butyrate) and the distal end 42 of the air-carrying member 38 forms a friction fit within the recesses 44 of the diffuser or air stone 46. Since the air stone is made of wood, its swelling causes a tightening of the fit between the air-carrying tube and stone.

It will thus be seen that the objects set forth above, among those made apparent from the preceding description, are efficiently attained and, since certain changes may be made in the above apparatus without departing from the scope of this invention, it is intended that all matter contained in the above description and shown in the accompanying drawings shall be interpreted as illustrative and not in a limiting sense. The rigid inner tube, as disclosed, permits the height to be set by pushing and pulling the rigid inner tube member downwardly or upwardly, respectively, with respect to the outer tube by manipulating the inner tube from the portion of the inner tube projecting above the aperture in the outer tube. Thus, it is possible to finally and permanently set said height while the tube is immersed in the aquarium since its height can be adjusted without interfering with the recirculation system. After the selected height is set, the inner tube is fixedly secured in place.

I claim:

1. For an aquarium with water, an undergravel aquarium filter and water recirculation system having a base member adapted to rest below said gravel, a rigid outer water-carrying tube carrying water from the bottom of the aquarium and discharging the water on top of the water within the aquarium, a rigid inner air-carrying tube located within said outer water-carrying tube to discharge air into the path of flow of the water being carried by said water-carrying tube, said water-carrying tube having a substantially vertical portion and a substantially horizontal portion connected together to carry said water vertically upward and discharge said water respectively, said substantially horizontal portion including an aperture located substantially directly above said vertical portion, said inner air-carrying member being passed through said aperture to descend within the vertical portion, and means for permanently fixedly securing said inner member at a selected height with respect to said water-carrying member, said inner tube being substantially coaxial with the vertical portion of said water-carrying member, said horizontal portion being located above the water level within said aquarium, said height being set by pushing and pulling said rigid inner tube downwardly or upwardly, respectively, with respect to said outer tube by manipulating said inner tube from the portion of said inner tube projecting above the aperture in said outer tube.

2. A device as set forth in claim 1, wherein said water-carrying tube is cylindrical and said air-carrying member is cylindrical.

3. A device as set forth in claim 2, wherein said air-carrying and said water-carrying tubes are plastic.

4. A device as set forth in claim 3, wherein said plastic is butyrate.

5. A device as set forth in claim 2, comprising an air diffuser connected to said distal end of said air-carrying tube.

6. A device as set forth in claim 2, wherein said inner air carrying member is glued to said water-carrying member at said aperture.

7. A device as set forth in claim 2, wherein said inner air-carrying member is sealed to said water-carrying member at said aperture.

8. A device as set forth in claim 1, said base member being provided with a connector means, said connector means taking the form of a collar, the distal end of said water-carrying member frictionally fitting within said collar so as to enable said water-carrying member to be connected to said base member.

* * * * *